United States Patent Office 2,854,204
Patented Sept. 30, 1958

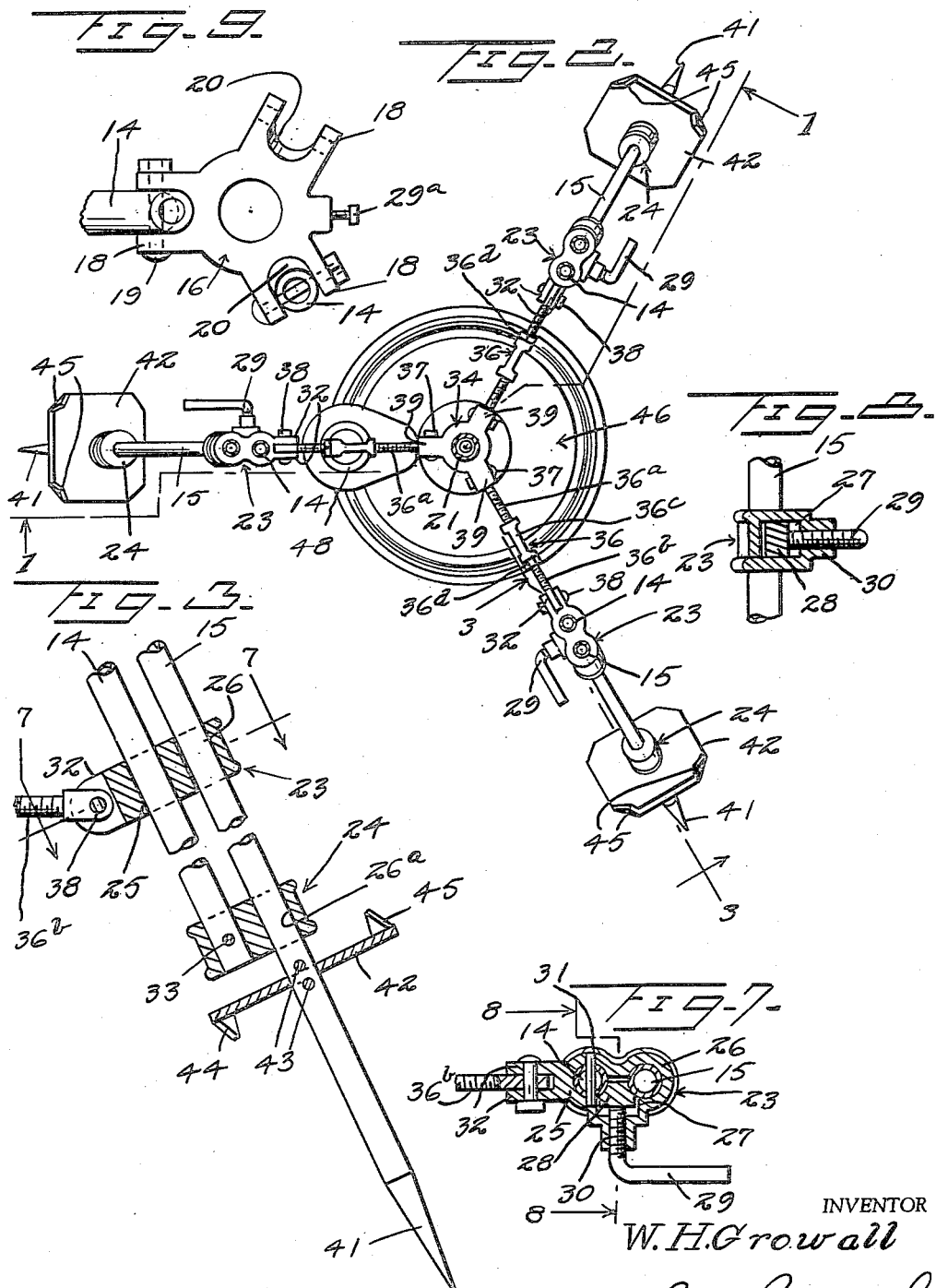

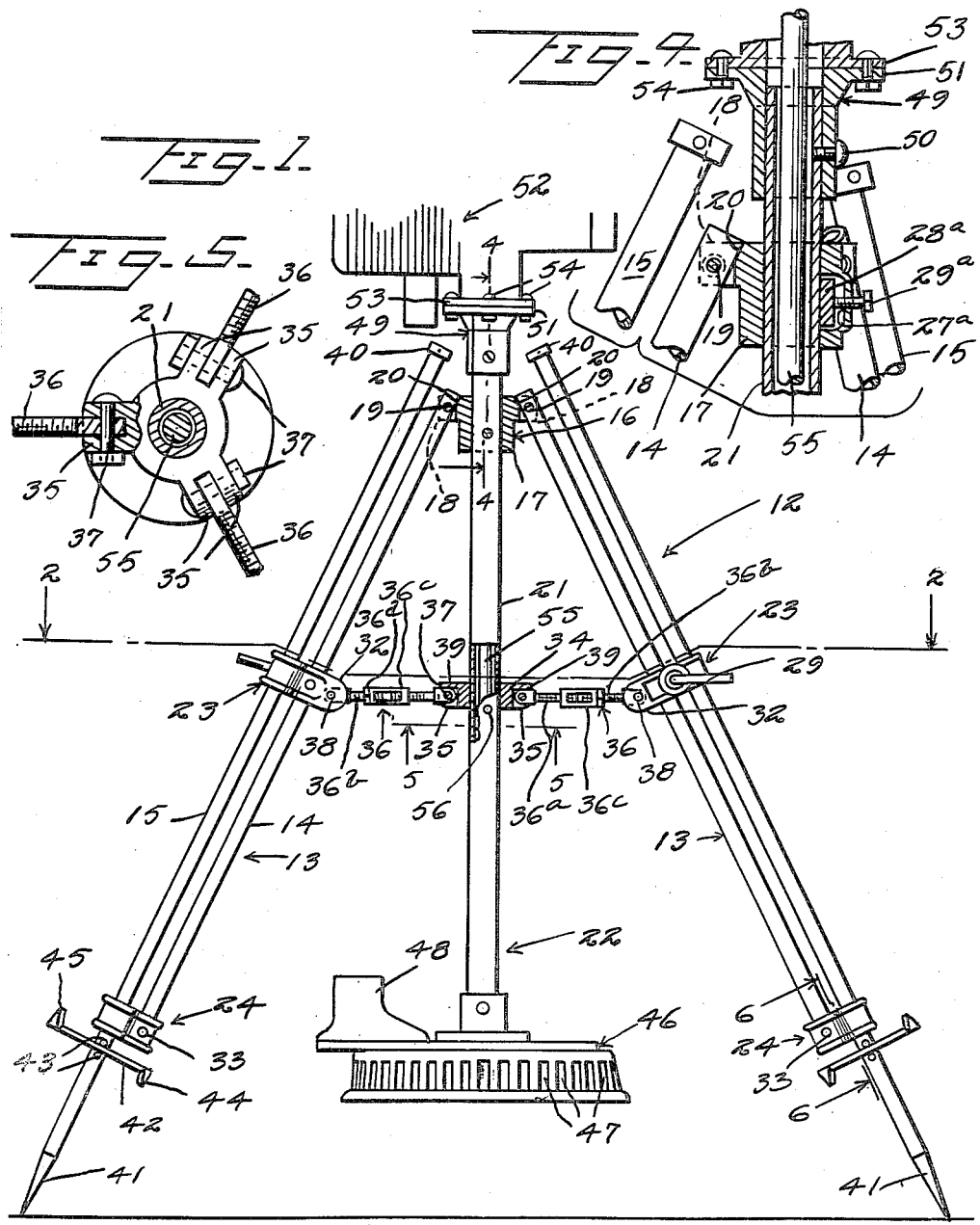

2,854,204

TRIPOD

William H. Growall, Detroit, Mich.

Application January 25, 1956, Serial No. 561,229

4 Claims. (Cl. 248—171)

This invention relates to a novel tripod primarily adapted for use as an adjustable support for a vertical pumping unit of the type commonly known as a "sump pump," utilized for draining cellars, pits and the like, and for supplying water where required from available bodies of water.

Another object of the invention is to provide a tripod which is likewise readily adapted for use for supporting surveying instruments, photographic equipment and the like.

Another object of the invention is to provide a tripod capable of being readily extended or retracted both longitudinally and laterally thereof and possessing novel means for effectively holding the tripod rigidly in an extended position.

Various other objects and advantages of the invention will hereinafter become more fully apparent from the following description of the drawings, illustrating a presently preferred embodiment thereof, and wherein:

Figure 1 is a vertical sectional view, partly broken away, of the tripod and showing a pump supported thereby, taken substantially along a plane as indicated by the line 1—1 of Figure 2;

Figure 2 is a horizontal sectional view, taken substantially along a plane as indicated by the line 2—2 of Figure 1;

Figure 3 is a fragmentary enlarged vertical sectional view, taken substantially along a plane as indicated by the line 3—3 of Figure 2;

Figure 4 is an enlarged fragmentary vertical sectional view, taken substantially along a plane as indicated by the line 4—4 of Figure 1;

Figure 5 is an enlarged fragmentary cross sectional view, taken substantially along a plane as indicated by the line 5—5 of Figure 1;

Figure 6 is an enlarged fragmentary sectional view, taken substantially along a plane as indicated by the line 6—6 of Figure 1;

Figure 7 is a fragmentary cross sectional view, taken substantially along a plane as indicated by the line 7—7 of Figure 3;

Figure 8 is a fragmentary sectional view, taken substantially along a plane as indicated by the line 8—8 of Figure 7, and Figure 9 is a fragmentary plan view of a portion of the tripod.

Referring more specifically to the drawings, the tripod in its entirety and comprising the invention is designated generally 12 and includes three extensible legs, each designated generally 13. Each of the legs 13 includes an elongated inner section 14 of circular cross section and a longer outer section 15. The leg sections 14 and 15 are preferably of rigid tubular construction.

The tripod 12 has a head 16 including an elongated central sleeve portion 17 and three pairs of ears 18 which extend outwardly from the upper portion of the sleeve 17 and are equally spaced circumferentially relative to one another. The upper ends of the leg sections 14 fit loosely between the ears of the pairs of ears 18 and are swingably connected thereto by pivot pins 19. Each pivot pin 19 extends loosely through a leg section 14 and through the pair of ears between which the upper end of said leg section is loosely disposed. As best seen in Figures 4 and 9, the head 16 has semicircular beveled surfaces 20, located between the upper portions of the ears of each pair of ears 18, which surfaces are adapted to be engaged by upper portions of the leg sections 14 which conformably fit therein, when said leg sections are swung outwardly to extended open positions, as illustrated in Figure 1.

An elongated tubular column 21, constituting a part of a pumping unit, designated generally 22, has a portion extending slidably through the sleeve 17 of the head 16 and to which column portion said head is detachably secured by clamping means, as best seen in Figure 4, including a friction block 28a which fits loosely in a recess 27a of the head 16, and a screw 29a which is threaded radially into the head and against the block 28 to force the block tightly against the column 21, when the screw 29a is advanced.

The sections 14 and 15 of each leg 13 are connected by an upper guide 23 and a lower guide 24. As best seen in Figures 3 and 7, the upper guide 23 includes spaced sleeve portions 25 and 26 through which the leg sections 14 and 15, respectively, extend. As seen in Figure 7, one side of the guide 23 between the sleeves 25 and 26 is provided with a recess 27 to loosely accommodate a friction block 28 of wedge shape cross section. A clamping screw 29 extends threadedly through a boss 30 of the guide 23 into the recess 27 so as to abut the friction block 28. By tightening or advancing the screw 29 inwardly, the friction block 28 is displaced inwardly between the leg sections 14 and 15 for immovably clamping said legs sections in the guide 23. Additionally, the guide 23 is secured immovably to the inner leg section 14 by a fastening 31. The guide 23 is provided at its inner end with a pair of spaced apertured ears 32. The lower guide 24 differs from the upper guide 23 in that it does not include the parts 27, 28, 29, 30 and 32. However, the lower guide 24 is secured by a fastening 33 to the inner and upper leg section 14 and the outer leg section 15 is freely movable slidably through the outer bore 26a of the guide 24.

A collar 34 is slidably disposed on the column 21 and is provided with three equally spaced pairs of apertured ears 35, as best illustrated in Figure 5. The inner ends of three braces 36 fit loosely between the ears of the pairs of ears 35 and are swingably connected thereto by pivot pins 37 which extend loosely through said brace ends and through the ears between which the brace ends are disposed. The opposite outer ends of the braces 36 fit loosely between the ears 32 of the three guides 23, and are pivotally connected thereto by pivot elements 38 which extend through said outer ends of the braces 36 and through the ears 32, as best seen in Figure 2. The collar 34 has plate portions 39 overlying the ears 35 of each pair of ears and forming stops or abutments, as will hereinafter become apparent. Each brace 36 is composed of spaced rods 36a and 36b having oppositely pitched threads and which rods are adjustably connected by a turnbuckle 36c, so that lengths of the braces 36 can be adjusted to compensate for wear in the tripod parts. A jamb nut 36d retains the brace parts in different adjusted positions.

Caps 40 are secured to the upper ends of the outer leg sections 15 to provide stop members for engagement with the upper guides 23 to limit the extent that the outer leg sections 15 can be extended downwardly through the guides 23 and 24 and to prevent disengagement of said leg sections 15 from said guides. Whereas the lower guides 24 are secured to the lower ends of the inner leg sections 14, the outer leg sections 15 extend downwardly through said lower guides 24 and terminate in solid tapered lower ends forming points 41. Above and adjacent the points 41, the outer legs sections 15 are each provided with a plate 42 which is retained thereon beneath the lower guide 24 thereof by a pair of retaining pins 43 which project diametrically through the leg section 15 and which pins 43 are disposed above and below the plate 42. Each plate 42 is preferably square and the corners thereof are bent to extend at right angles to the plane of the plate for form tapered prongs 44 and 45. Two of said prongs 44 of each plate 42 preferably extend downwardly, whereas the other two prongs 45 preferably project upwardly.

The pumping unit 22, in addition to the tubular column 21, includes a pump 46 of conventional construction which is attached to the lower end of the column 21 and which is of the submersible type having a ring of spaced inlet openings 47 and an upwardly extending outlet fitting 48 to which a hose or pipe, not shown, is adapted to be connected. A mounting adapter 49, as best illustrated in Figure 4, is secured by a fastening 50 to the upper end of the column 21 and has a mounting flange 51 at its upper end. A conventional prime mover such as a small gasoline engine or electric motor, a portion only of which is illustrated in Figure 1, and designated generally 52, has a bottom flange 53 which rests on the flange 51 and is secured thereto by a plurality of fastenings 54. The drive shaft of the motor or engine 52, designated 55, extends downwardly therefrom through the hollow column 21 into the pump 46 to which said shaft is connected in a conventional manner for driving the pump from the motor or engine 52.

When the tripod 12 and the pumping unit 22 are not in use, the collar 34 may be slid upwardly on the column 21 toward the head 16 and in so moving will cause the braces 36 to exert a pull on the guides 23 for swinging the legs 13 inwardly from their open positions as illustrated in the drawings to closed positions more nearly parallel to the column 21. With the legs 13 in closed positions, the tripod 12 and pumping unit 22 may be conveniently carried manually, may be conveniently placed in an automobile trunk or may be conveniently stored.

Likewise, by sliding the collar 34 downwardly away from the head 16 and toward its position of Figure 1, the legs 13 may be swung outwardly to open operative positions. The collar 34 is moved downwardly until portions of the upper edges of the braces 36 strike the abutments 39 to prevent further downward displacement of the collar 34. When the collar 34 and braces 36 are thus disposed, the pivots 37 are disposed slightly below the level of the pivots 38 for locking the legs 13 in open positions, and the upper portions of the leg sections 14 seat against the surfaces 20, as seen in Figures 4 and 9, for thus locking the legs under tension and to prevent vibration of the tripod when the engine or motor 52 and pump 46 are in operation. The retaining screws 29 may be loosened or backed off to release the friction blocks 28 from engagement with the leg sections 15, so that said sections may be extended downwardly through their guides 23 and 24 to desired extended positions. The screws 29 are then advanced inwardly to cause the leg sections 15 to be clamped in the guides 23 by the friction members 28. It will be readily apparent that the leg sections 15 may be selectively secured in different extended positions for mounting the tripod on an inclined surface and with the column 21 disposed substantially vertical. Where the tripod is mounted in soft earth as in the bottom of a body of water, pressure may be applied by stepping on the plates 42 for forcing the lower ends of the leg sections 15 into the earth or bottom. Said lower ends may be embedded up to the plates 42. The depending prongs 44 will then assist in anchoring the legs while the upstanding prongs 45 will function to prevent the operator's foot from slipping while exerting a downward pressure on the plates 42. It will also be apparent that the plates 42 may be omitted where not required, as where the tripod is supported on a solid surface such as a cellar floor. The extensible leg sections 15 enable the tripod 12 to be utilized with the pumping unit 22 in relatively deep bodies of water. Additionally, the fastening 22a may be removed and the column 21 may be slid upwardly through the collar 34 and head 16 until the opening 56 is disposed to receive the fastening 22a. Thus, the pumping unit 22 can be raised relative to the tripod 12 in this manner so that the pump 46 will be located beneath and adjacent the collar 34.

While the hollow column 21 cooperates with the tripod portions 16 and 34, so that said column forms a part of the tripod in addition to a part of the pumping unit 22, it will also be apparent that the tripod 12 may be utilized without the pumping unit 22 including its column 21 since it is not essential that a guide be provided for the movement of the collar 34 toward and away from the head 16. Thus, the tripod 12 readily adapts itself for supporting other devices such as surveying instruments or photographic equipment, not shown.

Various modifications and changes are contemplated and may obviously be resorted to, without departing from the spirit or scope of the invention as hereinafter defined by the appended claims.

I claim as my invention:

1. A tripod comprising three legs each formed of extensible sections including an inner section and an outer section, said outer sections being radially spaced outwardly from the inner sections, a head, means pivotally connecting upper complementary ends of the inner leg sections to said head, a pair of spaced guide members secured to each inner leg section and in which the outer leg section is slidably mounted, said guide members being spaced from one another and from said head, rigid braces having outer ends pivotally connected to corresponding guide members of said legs and extending inwardly therefrom, a member disposed between said legs and to which the inner ends of the braces are pivotally connected, said member being movable longitudinally of the tripod in one direction for exerting a pull on the braces to cause said legs to swing inwardly about their pivotal connections to the head toward closed positions and being movable in the opposite direction toward a position substantially coplanar with the braces for exerting an outward thrust on the braces and legs for swinging the legs outwardly to open positions, and clamping means associated with complementary guide members of the legs for clamping the outer leg sections selectively in different extended and retracted positions relative to the inner leg sections.

2. A tripod as in claim 1, and abutment means carried by and constituting a fixed part of said member and engaged by said braces when the legs are in extended positions with the pivots of the inner ends of the braces disposed slightly below the level of the pivots of the outer ends of the braces for limiting downward movement of said member.

3. A tripod as in claim 2, said pivot means for connecting the legs to the head including pairs of ears in which the upper ends of the inner leg sections are swingably mounted and pivot pins extending through the ears and through the inner leg sections, and said head having inclined surfaces engaged by portions of the inner leg sections which are disposed above the pivot pins when the legs are in open positions and cooperating with said braces and member for maintaining the legs in flexure when open.

4. A tripod as in claim 1, said clamping means including friction blocks of wedge shape cross section, said guide members, with which the clamping means are associated, having recesses for accommodating said wedge blocks in positions in engagement with both the inner and outer leg sections and between which the friction blocks are advanced for clamping the outer leg sections.

References Cited in the file of this patent

UNITED STATES PATENTS

| | | |
|---|---|---|
| 274,166 | Barrie | Mar. 20, 1883 |
| 347,927 | Esser | Aug. 24, 1886 |
| 383,535 | McPherson | May 29, 1888 |
| 937,612 | Kircher | Oct. 19, 1909 |
| 1,234,510 | Trautwein | July 24, 1917 |
| 1,394,596 | Wohl et al. | Oct. 25, 1921 |
| 1,849,303 | Labow | Mar. 15, 1932 |
| 1,948,584 | Johnson | Feb. 27, 1934 |
| 2,194,800 | Ley | Mar. 26, 1940 |
| 2,525,890 | Gage | Oct. 17, 1950 |
| 2,560,447 | Larsen | July 10, 1951 |
| 2,668,682 | Dalton | Feb. 9, 1954 |
| 2,678,790 | Egger | May 18, 1954 |